United States Patent [19]
Hocker

[11] 3,897,517
[45] July 29, 1975

[54] (THIO)PHOSPHORYL-AND PHOSPHONYL FORMAMIDINES

[75] Inventor: Jurgen Hocker, Cologne, Germany

[73] Assignee: Bayer Aktiengesellschaft, Leverkusen, Germany

[22] Filed: Sept. 14, 1973

[21] Appl. No.: 397,552

[30] Foreign Application Priority Data
Sept. 23, 1972  Germany............................ 2246890

[52] U.S. Cl. ................ 260/941; 260/940; 260/945; 260/968; 424/210; 424/211
[51] Int. Cl.......... A01n 9/36; C07f 9/24; C07f 9/44
[58] Field of Search ............ 260/940, 941, 944, 945

[56] References Cited
UNITED STATES PATENTS
3,281,321  10/1966  Malz et al. ...................... 260/944 X FOREIGN PATENTS OR APPLICATIONS
1,469,797  1/1967  France ............................... 260/944

Primary Examiner—Lorraine A. Weinberger
Assistant Examiner—Richard L. Raymond
Attorney, Agent, or Firm—Burgess, Dinklage & Sprung

[57] ABSTRACT (Thio)phosphoryl- and phosphonyl formamidines of the formula

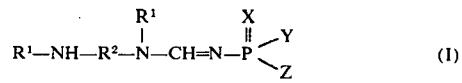

(I)

wherein
 X is O or S,
 Y and Z each independently is OR or SR, or one of them is R,
 R is an aliphatic, cycloaliphatic, aromatic, heterocyclic or araliphatic radical,
 $R^1$ is an aliphatic, cycloaliphatic, aromatic or heterocyclic radical, and
 $R^2$ is $-(C_nH_{2n})-$ or $-(C_pH_{2p-2})-$ optionally substituted by $C_{1-6}$ alkyl, chlorine, $NO_2$ or CN,
 n is 1, 2 or 3, and
 p is 2 or 3, or
 $R^2$ includes 1 or 2 carbon atoms of a 5-membered or 6-membered cycloaliphatic ring or a fused benzene ring, which possess insecticidal, acaricidal and nematocidal properties.

8 Claims, No Drawings

(THIO)PHOSPHORYL-AND PHOSPHONYL FORMAMIDINES

The present invention relates to and has for its objects the provision of particular new (thio)phosphoryl- and phosphonyl formamidines, e.g. $N^1$-phenyl-$N^1$-(2-anilino-ethyl)-$N^2$-(methoxy-methylthio-phosphoryl)-formamidine, and the like, which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g. insects, acarids and nematodes, with other and further objects becoming apparent from a study of the within specification and accompanying examples.

The invention provides (thio)phosphoryl- or (thio)-phosphonyl formamidines of the general formula

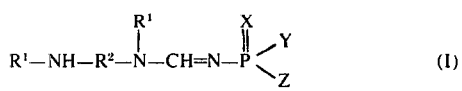

wherein
X is O or S,
Y and Z each independently is OR or SR, or one of them is R,
R is an aliphatic, cycloaliphatic, aromatic, heterocyclic or araliphatic radical,
$R^1$ is an aliphatic, cycloaliphatic, aromatic or heterocyclic radical, and
$R^2$ is —$(C_nH_{2n})$— or $(C_pH_{2p-2})$— optionally substituted by $C_{1-6}$ alkyl, chlorine, $NO_2$ or CN,
n is 1, 2 or 3, and
p is 2 or 3, or
$R^2$ includes 1 or 2 carbon atoms of a 5-membered or 6-membered cycloaliphatic ring or of a fused benzene ring.

When R and/or $R^1$ are aliphatic, optionally substituted, they preferably have up to about 16 carbon atoms, most preferably 1 to about 8 carbon atoms; these radicals can optionally be branched and can optionally contain up to 2 double bonds or a triple bond. If R and/or $R^1$ are cycloaliphatic, they preferably have about 5 to 12, preferably 5 or 6, carbon atoms in the ring system.

When R and/or $R^1$ are optionally substituted aromatic radicals they preferably have up to about 14, most preferably up to 12 or especially 6, carbon atoms in the ring sysstem, and in the case of the phenyl radical the latter can optionally also be bonded to a further phenyl radical, in that case optionally via an oxygen or sulfur atom.

When R and/or $R^1$ are heterocyclic radicals they preferably have from 5 to 7, preferably 5 or 6, ring members, and the heterocyclic ring system can contain oxygen, nitrogen or sulfur as the hetero-atom and can optionally be fused to a benzene ring.

The optionally substituted araliphatic radicals R are preferably those which contain the phenyl radical as the aryl moiety and which contain 1 to about 4, preferably 1 or 2, carbon atoms in the aliphatic moiety.

Possible substituents on the abovementioned aliphatic, aromatic or heterocyclic radicals or in the aromatic part of the araliphatic radicals are, for example: aryl (preferably phenyl), CN, $NO_2$, S-alkyl and alkoxy groups (with, preferably 1–4 carbon atoms), carboxylic acid ester groups (preferably those with $C_{1-6}$ aliphatic alcohols), as well as the di-substituted amino group (preferably substituted by lower aliphatic radicals, preferably with 1–4 carbon atoms), halogens (preferably fluorine, chlorine or bromine), lower haloalkyl radicals (preferably with 1 to 4 carbon atoms and preferably containing fluorine and/or chlorine) and, especially in the case of the aromatic and heterocyclic radicals, $C_{1-6}$ alkyl groups (preferably with 1 to 4 carbon atoms).

The invention also provides a process for the production of a compound of formula (I) in which a compound which contains a free (thio)phosphoric acid amide group or a (thio)phosphonic acid amide group, respectively, in the molecule, is reacted with a tetraaminoethylene of the general formula

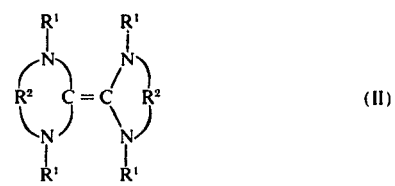

wherein
$R^1$ and $R^2$ have the meanings given above,
in the temperature range of about −20° to +200°C.

Preferably, the reaction is carried out at about 50° to 180°C, especially about 100° to 150°C.

The amides used for the process of the invention correspond to the general formula

wherein,
X, Y and Z have the meanings given above.

The process according to the invention is illustrated by the following formula scheme:

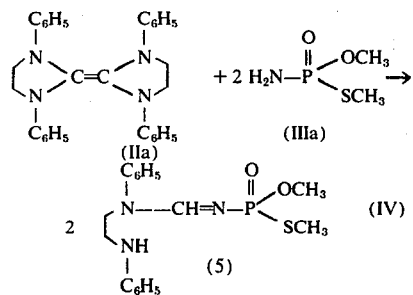

The tetraaminoethylenes used for the process are known or are obtainable according to known processes. The (thio)phosphoric acid amides or (thio)-phosphonic acid amides used for the process are known from the literature.

The process of the invention may be carried out by reacting a tetraaminoethylene and a (thio)phosphoric acid amide or (thio)phosphonic acid amide, optionally to an organic solvent and optionally under pressure. The quantities of the starting compounds are preferably so chosen that the stoichiometrically required amount of (thio)phosphoric acid amide or (thio)phosphonic acid amide is available per mole of tetraaminoethylene. The reaction can however also be carried out with an excess of (thio)phosphoric acid amide or (thio)phosphonic acid amide or an excess of tetraaminoethylene.

Where the process is carried out in the presence of a solvent, a solvent which is inert towards the reactants is naturally employed. As examples there may be mentioned aromatic hydrocarbons, such as benzene, chlorinated aromatic hydrocarbons, such as chlorobenzene or o-dichlorobenzene, and aliphatic hydrocarbons, such as chloroform or carbon tetrachloride, as well as dimethylformamide and acetonitrile.

The reaction can be carried out in solution in suspension. Of course it is also possible to react the components directly. Tetraaminoethylenes preferred for carrying out the process are: bis-[1,3-diaryl-imidazolidinylidenes-(2)], such as, for example, bis-[1,3-diphenyl-imidazolidinylidene-(2)], bis-[1,3-di(4-chloro-phenyl)-imidazolidinylidene-(2)]or bis-[1,3-di-$\alpha(\beta)$-naphthyl-imidazolidinylidene-(2)] and its substitution products, as well as bis-[1,3-dialkyl-imidazolidinylidenes-(2)], such as, for example, bis-[1,3-diethyl-imidazolidinylidene-(2)]. Some of these tetraaminoethylenes are described in H. W. Wanzlick, F. Esser and H. -J. Kleiner, Chem. Ber. 96, 1208 (1963). J. W. Scheeren and R. J. Nivard, Recueil des Pays Bas 88, 289 (1969) and U.S. Pat. No. 3,239,534.

As examples of (thio)phosphoric acid amides or (thio)phosphonic acid amides which can be used for the process according to the invention, there may be mentioned: dialkyl (thio)-phosphoric acid ester amides, preferably with alkyl groups with up to 10 carbon atoms, such as dimethyl-phosphoric acid ester amide, diethyl-phosphoric acid ester amide, di(iso) propyl-phosphoric acid ester amide, or O,S-dimethyl-thiophosphoric acid ester amide; diaryl-phosphoric acid ester amides such as, for example, diphenyl-phosphoric acid ester amides and its derivatives substituted in the phenyl radicals, alkylaryl-phosphoric acid ester amides and alkyl-aryl-thiophosphoric acid ester amides, such as O-methyl-O-(2-isopropoxycarbonylphenyl)-thiophosphoric acid ester amide, alkyl-(thio)phosphonic acid ester amides such as, for example, ethylthiophosphonic acid O-phenyl ester amide or ethyl-thiophosphonic acid O-(4-chloro-3-methyl-phenyl) ester amide, and aryl-(thio)phosphonic acid ester amides.

The process according to the invention is appropriately carried out with exclusion of atmospheric oxygen, in an inert gas atmosphere (preferably nitrogen).

The new (thio)phosphorylamidines or (thio)phosphonylamidines of the invention are valuable intermediate products and can be used for the production of plant protection agents but can also be used directly as such agents. They show characteristic bands at 3,200 to 3,400 cm$^{-1}$ (NH band) in the IR spectrum and 2 multiplets at $\delta \sim 3.3$ and 4.1 ppm, for $R^2 =$ —CH$_2$—CH$_2$—, in the NMR spectrum.

The new amidines according to the invention are distinguished by an outstanding insecticidal and acaricidal activity towards plant pests. They couple a low phytoxicity with a good action against both sucking and biting insects.

To the sucking insects there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the currant gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the red bug (Cimex lectularius), the assassin bug (Rhodnius prolixus) and Chagas's bug (Triatoma infestans) and, further, cicadas, such as Euscelis bilobatus and Nephotettix bipunctatus.

In the case of the biting insects, above all there should be mentioned butterfly and moth caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella).

Also to be classed with the biting insects are beetles (Coleoptera), for example the granary weevil (Sitophilus granarius = Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidius = Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the saw-toothed grain beetle (Oryazephilus surinamensis), and also species living in the soil, for example wireworms (Agriotes spec.) and larvae of the cockchafer (Melolontha melolontha); cockroaches, such as the German cockroach (Blattella germanica), American cockroach (Periplaneta americana), Madeira cockroach (Leucophaea or Rhyparobia maderae), oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Gryllus domesticus); termites such as the eastern subterranean termite (Reticulitermes flavipes) and Hymenoptera such as ants, for example the garden ant (Lasius niger).

The Diptera comprise essentially the flies, such as the vinegar fly (Drosophila melanogaster), the Mediterranean fruit fly (Ceratitis capitata), the house fly (Musca domestica), the little house fly (Fannia canicularis), the black blow fly (Phormia aegina) and bluebottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi).

With the mites (Acari) there are classed, in particular, the spider mites (Tetranychidae) such as the two-spotted spider mite (Tetranychus urticae) and the European red mite (Paratetranychus pilosus = Panonychus ulmi), gall mites, for example the blackcurrant gall mite (Eriophyes ribis) and tarsonemids, for example the broad mite (Hemitarsonemus latus) and the cyclamen mite (Tarsonemus pallidus); finally, ticks, such as the relapsing fever tick (Ornithodorus moubata).

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloaklanes (e.g. cyclohexane, etc), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etcl.); whereas the following may be chiefly considered for use as conventional carrier vehicle assistants, e.g. surface-active agents, for this purpose: emulsifying agents, such as non-ionic and-/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and nematocides, or rodenticides, fungicides, bactericides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Futhermore, the present invention contemplates methods of selectively killing, combating or controlling pests, e.g. insects, acarids and nematodes, which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally or nematocidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Thereof, in special cases it is possible to go above or below the aforementioned concentration ranges.

was determined as a percentage: 100% means that all the flies were killed; 0% means that none of the flies were killed.

The active compounds, their concentrations, the evaluation times and the degree of destruction can be seen from Table 1.

Table 1

| Active compound | (Drosophila test) | Active compound concentration in % | Degree of destruction in % after 1 day |
|---|---|---|---|
| $CH_3O\diagdown\overset{S}{\underset{\|}{P}}-OCH_3$ $NH_2\diagup$ (known) | (A) | 0.1 | 0 |
| ⟨phenyl⟩-NH-CH$_2$-CH$_2$-N-CH=N-P(=S)(OC$_6$H$_5$)(OC$_2$H$_5$), N-phenyl | (8) | 0.1 <br> 0.01 | 100 <br> 95 |
| ⟨phenyl⟩-NH-CH$_2$-CH$_2$-N-CH=N-P(=S)(OCH$_3$)(O-aryl), N-phenyl; aryl = 2-(isopropoxycarbonyl)phenyl | (6) | 0.1 <br> 0.01 | 99 <br> 20 |

The synthesis, unexpected superiority and outstanding activity of the particular new compounds of the present invention are illustrated, without limitation, by the following examples:

EXAMPLE 1

Drosophila test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

1 ml of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction

EXAMPLE 2

Phaedon larvae test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) were sprayed with the preparation of the active compound unit dripping wet and were then infested with mustard beetle larvae (*Phaedon cochleariae*).

After the specified periods of time, the degree of destruction was determined in %: 100% means that all beetle larvae were killed whereas 0% means that none of the beetle larvae were killed.

The active compounds, the concentrations of the active compounds, the evaluation times and the results can be seen from Table 2.

Table 2

| Active compound | (Phaedon larvae test) | Active compound concentration in % | Degree of destruction in % after 3 days |
|---|---|---|---|
| $CH_3O\diagdown\overset{S}{\underset{\|}{P}}-SC_2H_5$ $CH_3O\diagup$ (known) | (B) | 0.1 <br> 0.01 | 100 <br> 0 |
| ⟨phenyl⟩-NH-CH$_2$-CH$_2$-N-CH=N-P(=O)(OCH$_3$)(SCH$_3$), N-phenyl | (5) | 0.1 <br> 0.01 | 100 <br> 100 |

Table 2-Continued

| Active compound | (Phaedon larvae test) | Active compound concentration in % | Degree of destruction in % after 3 days |
|---|---|---|---|
| Cl–⟨⟩–NH–CH₂–CH₂–N–CH=N–P(=O)(OCH₃)(SCH₃), with C₆H₄Cl on N | (4) | 0.1<br>0.01 | 100<br>100 |
| ⟨⟩–NH–CH₂–CH₂–N–CH=N–P(=S)(OCH₃)(O–C₆H₄–CO–O–CH(CH₃)₂), with C₆H₅ on N | (6) | 0.1<br>0.01<br>0.001 | 100<br>100<br>95 |
| Cl–⟨⟩–NH–CH₂–CH₂–N–CH=N–P(=S)(OCH₃)(O–C₆H₄–CO–O–CH(CH₃)₂), with C₆H₄Cl on N | (7) | 0.1<br>0.01<br>0.001 | 100<br>100<br>40 |
| H₃CO–⟨⟩(OCH₃)–NH–CH₂–CH₂–N–CH=N–P(=S)(OCH₃)(O–C₆H₄–CO–O–CH(CH₃)₂), with C₆H₄(OCH₃) on N | (10) | 0.1<br>0.01 | 100<br>100 |

EXAMPLE 3

Myzus test (contact action)

Solvent: 3 parts by weight of acetone
Emulsifier: 1 part by weight of alkylaryl polygylcol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from Table 3.

Table 3

| Active compound | (Myzus test) | Active compound concentration in % | Degree of destruction in % after 1 day |
|---|---|---|---|
| (CH₃O)(CH₃–NH)P(=S)–SC₂H₅ (known) | (C) | 0.1 | 0 |
| ⟨⟩–NH–CH₂–CH₂–N(C₆H₅)–CH=N–P(=O)(OCH₃)(SCH₃) | (5) | 0.1<br>0.01 | 100<br>95 |
| Cl–⟨⟩–NH–CH₂–CH₂–N(C₆H₄Cl)–CH=N–P(=O)(OCH₃)(SCH₃) | (4) | 0.1<br>0.01 | 100<br>75 |

Table 3

(Myzus test)

| Active compound | | Active compound concentration in % | Degree of destruction in % after 1 day |
|---|---|---|---|
| H₃CO-⟨C₆H₄⟩-NH-CH₂-CH₂-N(−C₆H₄-OCH₃)-CH=N-P(=O)(OCH₃)(SCH₃) | (11) | 0.1<br>0.01 | 98<br>90 |
| ⟨C₆H₅⟩-NH-CH₂-CH₂-N(-C₆H₅)-CH=N-P(=S)(OCH₃)(O-C₆H₄-O-CO-CH(CH₃)₂) | (6) | 0.1<br>0.01 | 100<br>70 |
| H₃CO-⟨C₆H₄⟩-NH-CH₂-CH₂-N(-C₆H₄-OCH₃)-CH=N-P(=S)(OCH₃)(O-C₆H₄-O-CO-CH(CH₃)₂) | (10) | 0.1<br>0.01 | 95<br>20 |

EXAMPLE 4

Doralis test (systemic action)

Solvent: 3 parts by weight of acetone
Emulsifier: 1 part by weight of alkylaryl polyglycol ether To produce a suitable preparation of active compound, 1 part by weight of the active compound was mixed with the stated amount of solvent and the stated amount of emulsifier and the concentrate was diluted with water to the desired concentration.

Bean plants (*Vicia faba*) which were heavily infested by bean aphids (*Doralis fabae*) were watered with the preparation of the active compound so that the preparation of the active compound penetrated into the soil without wetting the leaves of the bean plants. The active compound was taken up by the bean plants from the soil and thus reached the infested leaves.

After the stated times, the degree of destruction was determined in %. 100% denotes that all aphids were killed and 0% denotes that no aphids were killed.

The active compounds, the concentration of the active compounds, the evaluation times and the results can be seen from Table 4.

Table 4

(Doralis test / systemic)

| Active compound | | Active compound concentration in % | Degree of destruction in % after 4 days |
|---|---|---|---|
| (CH₃O)(CH₃-NH)P(=S)-SC₂H₅ (known) | (C) | 0.1 | 0 |
| ⟨C₆H₅⟩-NH-CH₂-CH₂-N(-C₆H₅)-CH=N-P(=O)(OCH₃)(SCH₃) | (5) | 0.1<br>0.01 | 100<br>100 |
| Cl-⟨C₆H₄⟩-NH-CH₂-CH₂-N(-C₆H₄-Cl)-CH=N-P(=O)(OCH₃)(SCH₃) | (4) | 0.1<br>0.01 | 100<br>100 |

Table 4 -Continued

| Active compound | (Doralis test / systemic) | Active compound concentration in % | Degree of destruction in % after 4 days |
|---|---|---|---|
| H₃CO—⟨phenyl⟩—NH—CH₂—CH₂—N—CH=N—P(=O)(OCH₃)(SCH₃), with N bearing a p-OCH₃-phenyl group | (11) | 0.1<br>0.01 | 100<br>100 |
| ⟨phenyl⟩—NH—CH₂—CH₂—N—CH=N—P(=S)(OCH₃)(O-phenyl-o-C(=O)-O-CH(CH₃)₂), with N bearing a phenyl group | (6) | 0.1<br>0.01 | 100<br>75 |

EXAMPLE 5

Tetranychus test (resistant)

Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10–30 cm, were sprayed with the preparation of the active compound until dripping wet. These bean plants were heavily infested with the common or two-spotted spider mite (*Tetranychus urticae*) in all stages of development.

After the specified periods of time, the effectiveness of the preparation of active compound was determined by counting the dead mites. The degree of destruction thus obtained was expressed as a percentage; 100% means that all the spider mites were killed whereas 0% means that none of the spider mites were killed.

The active compounds, the concentrations of the active compounds, the evaluation times and the results can be seen from Table 5.

Table 5

| Active compound | (Tetranychus test / resistant) | Active compound concentration in % | Degree of destruction in % after 2 days |
|---|---|---|---|
| (CH₃O)(NH₂)P(=S)—OCH₃ (known) | (A) | 0.1 | 0 |
| (CH₃O)(CH₃—NH)P(=S)—SC₂H₅ (known) | (C) | 0.1 | 0 |
| ⟨phenyl⟩—NH—CH₂—CH₂N—CH=N—P(=O)(OCH₃)(SCH₃), with N bearing a phenyl group | (5) | 0.1 | 100 |
| Cl—⟨phenyl⟩—NH—CH₂—CH₂—N—CH=N—P(=O)(OCH₃)(SCH₃), with N bearing a p-Cl-phenyl group | (4) | 0.1 | 100 |

Table 5 — Continued

| Active compound | (Tetranychus test / resistant) | Active compound concentration in % | Degree of destruction in % after 2 days |
|---|---|---|---|
| 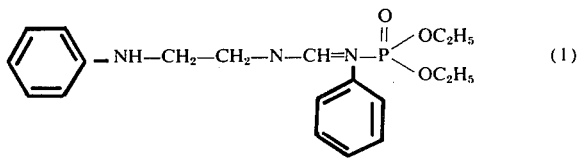 | (11) | 0.1 | 95 |
| 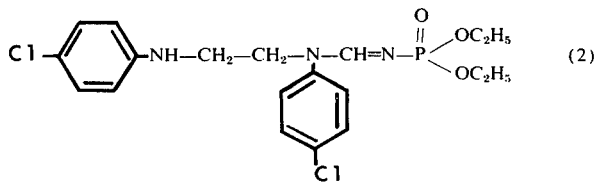 | (6) | 0.1 | 95 |

The following examples illustrate the synthesis of the compounds.

EXAMPLE 6

44.4 parts by weight of bis-[1,3-diphenyl-imidazolidinylidene-(2)] and 30.6 parts by weight of diethyl-phosphoric acid ester amide in 200 parts by volume of absolute toluene were heated to the boil under nitrogen for 35 minutes. After removing the solvent, 95 parts by weight of $N^1$-phenyl-$N^1$-(2-anilino-ethyl)-$N^2$-diethoxyphosphorylformamidine of the formula

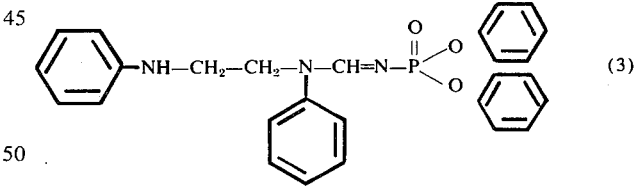

were obtained, showing the abovementioned characteristic bands in the IR spectrum and NMR spectrum at 3,250 cm$^{-1}$ and $\delta = 3.35$ and $\delta \sim 4$ ppm, respectively.

EXAMPLE 7

58.2 parts by weight of bis-[1,3-(4-chlorophenyl)imidazolidinylidene-(2)] and 30.6 parts by weight of diethylphosphoric acid ester amide in 150 parts by volume of toluene were heated to the boil under nitrogen for 30 minutes. After cooling to 0°C, 67.0 parts by weight of $N^1$(4-chloro-phenyl)-$N^1$-[2-(4-chloro-phenylamino)-ethyl]-$N^2$-diethoxyphosphorylformamidine of the formula and of melting point 107°–108°C were filtered off.
Analysis: Calculated: C 51.36, H 5.45, N 9.45.
Found: 51.3, 5.5, 9.4.
IR: 3,320 cm$^{-1}$ (NH), NMR: $\delta = 3.43$ and $\delta \sim 4.3$ ppm.

EXAMPLE 8

22.2 parts of bis-[1,3-diphenyl-imidazolidinylidene(2)] and 24.9 parts by weight of diphenyl-phosphoric acid ester amide in 100 parts by volume of toluene were heated to the boil under nitrogen for 35 minutes. After removing the solvent in vacuo, there remained 47 parts by weight of $N^1$-phenyl-$N^1$-(2-anilino-ethyl)-$N^2$-(bisphenoxy-phosphoryl)formamidine of the formula showing the abovementioned characteristic bands in the IR spectrum and NMR spectrum at 3,280 cm$^{-1}$ and $\delta = 3.3$ and $\delta \sim 4.1$ ppm, respectively.
Analysis: Calculated: C 68.83, H 5.56, N 8.91.
Found: 69.3, 5.5, 8.9.

EXAMPLE 9

58.2 parts by weight of bis-[1,3-di(4-chlorophenyl)imidazolidinylidene-(2)] and 28.2 parts by weight of O,S-dimethyl-thiophosphoric acid ester amide in 150 parts by volume of toluene were heated to the boil under nitrogen for 35 minutes. After removing the solvent in vacuo, 86.4 parts by weight of $N^1$-(4-chloro-phenyl)-$N^1$-[2-(4-chloro-phenylamino)ethyl]-$N^2$-(methoxy-methylthio-phosphoryl)-formamidine of the formula

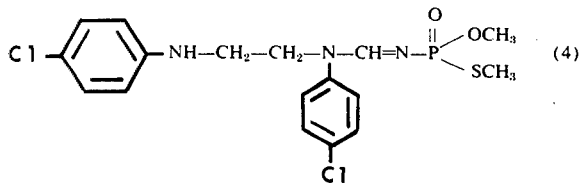

(4)

remained.

Analysis: Calculated: C 47.23, H 4.66, N 9.72.
Found: 47.9, 5.1, 9.6.

The compound showed the characteristic bands in the IR spectrum and NMR spectrum at 3,260 cm$^{-1}$ and δ = 3.4 and δ ~ 4.2 ppm, respectively.

EXAMPLE 10

44.4 parts by weight of bis-[1,3-diphenyl-imidazolidinylidene-(2)] and 28.2 parts by weight of O,S-dimethylthiophosphoric acid ester amide in 150 parts by volume of anhydrous toluene were heated to the boil under nitrogen for 35 minutes. After removing the solvent, 74.5 parts by weight of N$^1$-phenyl-N$^1$-(2-anilino-ethyl)-N$^2$-(methoxy-methylthio-phosphoryl)-formamidine of the formula

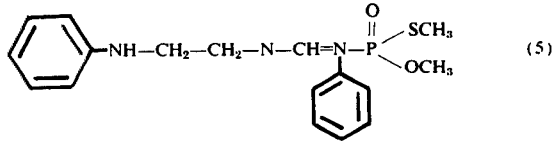

(5)

were obtained as the residue.

Analysis: Calculated: C 56.19, H 6.10, N 11.57.
Found: 56.1, 5.9, 11.6.

IR: 3,260 cm$^{-1}$; NMR: δ = 3.3 and δ ~ 4.2 ppm

EXAMPLE 11

22.2 parts by weight of bis-[1,3-diphenyl-imidazolidinylidene-(2)] and 28.9 parts by weight of O-methyl-O-(2-isopropoxycarbonyl-phenyl)-thiophosphoric acid ester amide in 100 parts by volume of toluene were heated to the boil for 10 minutes under nitrogen and under reflux. After removing the solvent, N$^1$-phenyl-N$^1$-(2-anilino-ethyl)-N$^2$-[methoxy-(2-isopropoxycarbonyl-phenoxy)-thiophosphoryl]-formamidine of the formula

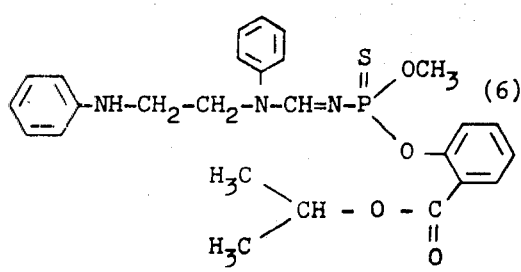

(6)

was obtained in practically quantitative yield.

Analysis: Calculated: C 60.92, H 5.90, N 8.20.
Found: 61.1, 6.1, 8.2.

IR: 3,320 cm$^{-1}$ NMR: δ = 3.3 and δ ~ 4.2 ppm.

EXAMPLE 12

29.1 parts by weight of bis-[1,3-di(4-chlorophenyl)imidazolidinylidene-(2)] and 28.9 parts by weight of O-methyl-O-(2-isopropoxycarbonyl-phenyl)-thiophosphoric acid ester amide in 100 parts by volume of xylene were heated to the boil under nitrogen for 5 minutes. After removing the solvent, N$^1$-(4-chlorophenyl)-N$^1$-[2-(4-chloro-phenylamino)ethyl]-N$^2$-[methoxy-(2-isopropoxycarbonyl-phenoxy)-thiophosphoryl]-formamidine of the formula

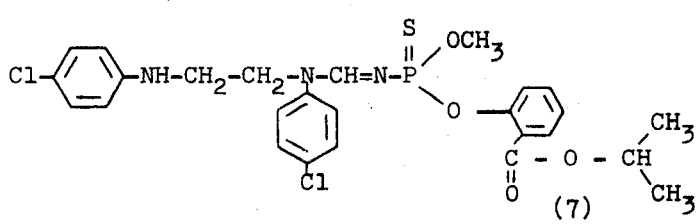

(7)

was obtained in practically quantitative yield.

Analysis: Calculated: C 53.80, H 4.87, N 7.25.
Found: 54.4, 4.9, 7.1.

IR: 3,310 cm$^{-1}$ NMR: δ = 3.3 and δ ~ 4.1 ppm.

EXAMPLE 13

22.2 parts by weight of bis-[1,3-diphenyl-imidazolidinylidene-(2)] and 20.1 parts by weight of ethyl-thiophosphonic acid O-phenyl ester amide in 100 parts by volume of absolute toluene were heated to the boil under nitrogen for 25 minutes. After cooling to 0°C, 37.5 parts by weight of N$^1$-phenyl-N$^1$-(2-anilino-ethyl)-N$^2$-(phenoxy-ethyl-thiophosphonyl)-formamidine of the formula

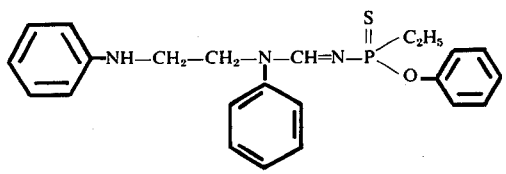

(8)

were filtered off as colorless crystals of melting point 106°–108°C.

Analysis: Calculated C 65.22, H 6.19, N 9.92.
Found: 65.2, 6.2, 9.9.

IR: 3,420 cm$^{-1}$ NMR: δ = 3.3 and δ ~ 4.2 ppm.

EXAMPLE 14

25.0 parts by weight of ethyl-thiophosphonic acid O-(4-chloro-3-methylphenyl) ester amide and 22.2 parts by weight of bis-[1,3-diphenyl-imidazolidinylidene-(2)] in 100 parts by volume of absolute toluene were heated to the boil for 40 minutes under reflux and under nitrogen. After removing the solvent in vacuo, N$^1$-phenyl-N$^1$-(2-anilino-ethyl)-N$^2$-[(4-chloro-3-methylphenoxy)-ethyl-thiophosphonyl]-formamidine of the formula

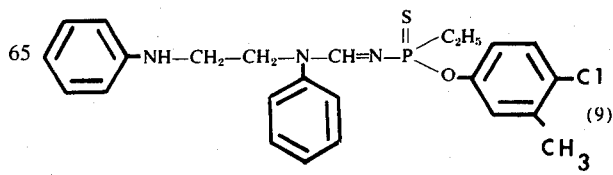

(9)

was obtained in practially quantitative yield. It showed the properties characteristic for this class of compounds in the IR and NMR spectrum at 3,360 cm$^{-1}$ and $\delta = 3.3$ and $\delta \sim 4.1$ ppm.

Analysis: Calculated: C 61.07, H 5.77, N 8.90.
Found: 60.8, 5.8, 8.9.

Other compounds which can be similarly prepared include:

N$^1$-ethyl-N$^1$-(3-ethylaminopropyl)-N$^2$-(cyclohexyloxybenzyl-phosphonyl)-formamidine, N$^1$-propyl-N$^1$-(1-methyl-2-cyclohexylaminoethyl)-N$^2$-(phenylthiophenylthiophosphonyl)-formamidine, N$^1$-ethyl-N$^1$-(2-ethylamino-cylohexyl)-N$^2$-[bis-(4-bromophenoxy)-thiophosphoryl]-formamidine, N$^1$-ethyl-N$^1$-(2-ethylamino-ethylenyl)-N$^2$-(bisethoxy)phosphoryl formamidine, N$^1$-phenyl-N$^1$-(2-anilino)-phenyl-N$^2$-(bismethoxy)-thiophosphoryl formamidine, N$^1$-piperidino-N$^1$-(2-piperidino-ethyl)-N$^2$-(methoxy-methylthio-phosphoryl)-formamidine, N$^1$-morpholino-N$^1$-(2-morpholino-ethyl)-N$^2$-[methoxy-(2-isopropoxycarbonyl-phenoxy)-thiophosphoryl]-formamidine, N$^1$-phenyl-N$^1$-(2-anilino-1-chlor-ethyl)-N$^2$-(ethoxy-ethylthio-phosphoryl)-formamidine It will be appreciated that the instant specification and examples are set forth by way of illustration and not limitation, and that various modifications and changes may be made without departing from the spirit and scope of the present invention.

What is claimed is:

1. A (thio)phosphoryl- or (thio)phosphonyl formamidine of the formula

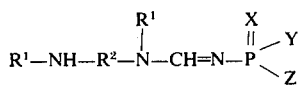

wherein
X is O or S,
Y and Z each independently is OR or SR, or one of them is R,
R is alkyl with up to about 16 carbon atoms, cycloalkyl with about 5 to 12 carbon atoms, phenyl, isopropoxycarbonylphenyl, or phenalkyl with up to 6 carbon atoms in the alkyl group,
R$^1$ is alkyl with up to about 16 carbon atoms, cycloalkyl with about 5 to 12 carbon atoms, phenyl, chlorophenyl or methoxyphenyl,
R$^2$ is —(C$_n$H$_{2n}$)— or —(C$_p$H$_{2p-2}$)— optionally substituted by C$_{1-6}$ alkyl, chlorine, NO$_2$ or CN, or is cyclohexylene or phenylene,
n is 1, 2 or 3, and
p is 2 or 3.

2. A compound according to claim 1 wherein R$^2$ is —(C$_n$H$_{2n}$)— and n is 2 or 3.

3. A compound according to claim 1 wherein X is O, Y is OR, Z is OR, R is methyl, R$^1$ is phenyl and R$_2$ is —CH$_2$—CH$_2$—.

4. The compound according to claim 1 wherein such compound is N$^1$-(4-chloro-phenyl)-N$^1$-[2-(4-chlorophenylamino)ethyl]-N$^2$-(methoxy-methylthio-phosphoryl)-formamidine of the formula

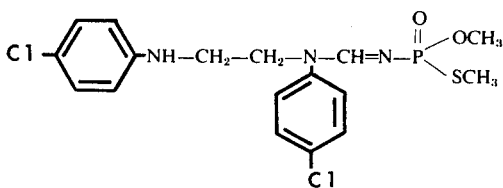

5. The compound according to claim 1 wherein such compound is N$^1$-phenyl-N$^1$-(2-anilino-ethyl)-N$^2$-(methoxymethylthio-phosphoryl)-formamidine of the formula

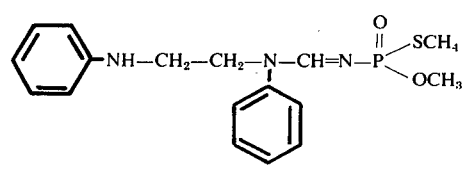

6. The compound according to claim 1 wherein such compound is N$^1$-phenyl-N$^1$-(2-anilino-ethyl)-N$^2$-[methoxy-(2-isopropoxycarbonyl-phenoxy)-thiophosphoryl]-formamidine of the formula

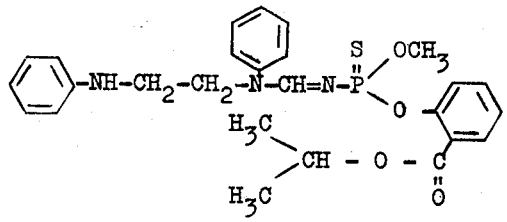

7. The compound according to claim 1 wherein such compound is N$^1$-(4-chloro-phenyl)-N$^1$-[2-(4-chlorophenylamino)ethyl]-N$^2$-[methoxy-(2-isopropoxycarbonyl-phenoxy)-thiophosphoryl]-formamidine of the formula

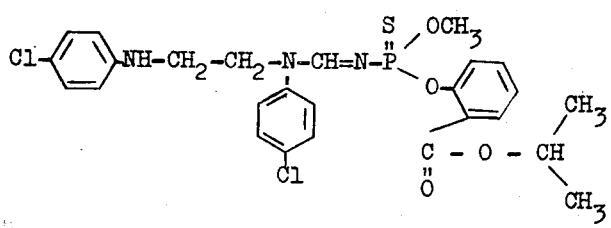

8. The compound according to claim 1 wherein such compound is N$^1$-(4-methoxy-phenyl)-N$^1$-[2-(4-methoxy-phenylamino)ethyl]-N$^2$-(methoxy-methylthio-phosphoryl)-formamidine of the formula

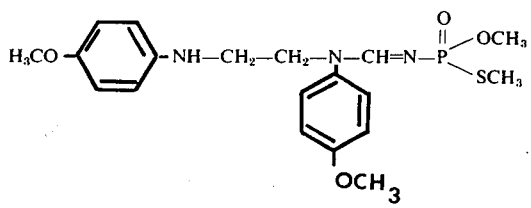

* * * * *